United States Patent
Schmidt

(10) Patent No.: US 11,993,342 B2
(45) Date of Patent: May 28, 2024

(54) CRANK DRIVE WITH PERIODIC CHANGE OF EFFECTIVE LEVER LENGTH

(71) Applicant: Felix Schmidt, Kindberg/Steiermark (AT)

(72) Inventor: David Schmidt, Kindberg/Steiermark (AT)

(*) Notice: Subject to any disclaimer, the term of this patent is extended or adjusted under 35 U.S.C. 154(b) by 0 days.

(21) Appl. No.: 17/261,498

(22) PCT Filed: Jul. 18, 2019

(86) PCT No.: PCT/EP2019/000223
§ 371 (c)(1),
(2) Date: Jan. 19, 2021

(87) PCT Pub. No.: WO2020/015852
PCT Pub. Date: Jan. 23, 2020

(65) Prior Publication Data
US 2021/0163095 A1    Jun. 3, 2021

(30) Foreign Application Priority Data
Jul. 18, 2018   (DE) .................... 20 2018 003 342.1

(51) Int. Cl.
*B62M 3/04*        (2006.01)
*B62M 1/36*        (2013.01)
(Continued)

(52) U.S. Cl.
CPC ............... *B62M 3/04* (2013.01); *B62M 1/36* (2013.01); *B62M 3/06* (2013.01); *F16H 21/20* (2013.01);
(Continued)

(58) Field of Classification Search
CPC . B62M 1/30; B62M 1/36; B62M 3/02; B62M 3/04; B62M 3/06; B62M 2003/006;
(Continued)

(56) References Cited

U.S. PATENT DOCUMENTS 318,532 A * 5/1885 Beavis ................... B62M 17/00
                                                    280/260
608,341 A * 8/1898 Murray .................... F16H 1/20
                                                     74/421 R
(Continued)

FOREIGN PATENT DOCUMENTS

CA    2352977    5/2000
CA    2436110    2/2005
(Continued)

OTHER PUBLICATIONS

International Search Report for PCT/EP2019/000223 dated PCT/EP2019/000223, 5 pages.
(Continued)

*Primary Examiner* — Adam D Rogers
(74) *Attorney, Agent, or Firm* — FisherBroyles LLP

(57) ABSTRACT

In order to form a largely oval circulatory path, in particular a pedal (1a), a crank drive (1) is described which periodically changes the effective lever length of a crank (2). In this case, gear levers (4' or 7) are mounted on a crank (2) at both ends (2 a, 2b) which rotate in opposite directions with respect to one another and thus form two further movement axes within the pedal path and are thus adapted to the natural human leg movement in a force-saving and ergonomic manner.

15 Claims, 14 Drawing Sheets

(51) Int. Cl.
*B62M 3/06* (2006.01)
*F16H 21/20* (2006.01)
*F16H 37/02* (2006.01)
*B62M 3/00* (2006.01)

(52) U.S. Cl.
CPC ....... *B62M 2003/006* (2013.01); *F16H 37/02* (2013.01)

(58) Field of Classification Search
CPC ...... F16H 21/20; F16H 37/02; Y10T 74/2164; Y10T 74/2165; Y10T 74/2167
See application file for complete search history.

(56) References Cited

U.S. PATENT DOCUMENTS

| | | | | |
|---|---|---|---|---|
| 4,261,223 | A * | 4/1981 | Johnson | B62M 1/36 74/393 |
| 4,809,970 | A * | 3/1989 | Beistegui | A63B 21/225 482/110 |
| 4,960,013 | A * | 10/1990 | Sander | B62M 3/04 74/594.2 |
| 5,419,572 | A * | 5/1995 | Stiller | B62M 1/36 280/252 |
| 6,830,259 | B2 * | 12/2004 | Jakovljevic | B62M 1/36 280/259 |
| RE40,127 | E * | 3/2008 | Oda | B62M 1/28 280/261 |
| 7,520,196 | B2 * | 4/2009 | Stallard | B62M 3/04 74/594.1 |
| 9,259,609 | B2 * | 2/2016 | Yang | A63B 21/4049 |
| 10,710,673 | B2 * | 7/2020 | Jacques | B62M 3/00 |
| 11,161,566 | B1 * | 11/2021 | Fitzgibbons | B62M 3/08 |
| 11,465,709 | B2 * | 10/2022 | Pompea | B62J 25/06 |
| 2007/0137427 | A1 | 6/2007 | Stallard | |
| 2007/0298935 | A1 * | 12/2007 | Badarneh | A63B 22/0605 482/52 |
| 2009/0039613 | A1 | 2/2009 | Hartmann | |
| 2015/0292548 | A1 * | 10/2015 | Wu | B62M 3/04 74/600 |
| 2021/0057962 | A1 * | 2/2021 | Tsukamoto | B62M 15/00 |

FOREIGN PATENT DOCUMENTS

| | | | | |
|---|---|---|---|---|
| CN | 101022991 | | 8/2007 | |
| DE | 102011016263 | | 10/2012 | |
| EP | 1926924 | B1 * | 1/2010 | ............ B62M 3/04 |
| FR | 2 259 006 | | 8/1975 | |
| JP | H09-323691 | | 12/1997 | |
| JP | H10-35573 | | 2/1998 | |
| JP | 2003-011878 | | 1/2003 | |
| JP | 2005271894 | | 10/2005 | |
| JP | 2010076512 | | 4/2010 | |
| JP | 6977156 | B2 * | 12/2021 | ............ B62M 11/02 |
| WO | 2006000206 | | 1/2006 | |
| WO | 2016/134044 | | 8/2016 | |

OTHER PUBLICATIONS

Written Opinion of the ISA for PCT/EP2019/000223 dated PCT/EP2019/000223, 6 pages.
Chinese First Office Action dated Feb. 16, 2022, in Chinese Application No. 201980047912.5, including English translation.
Chinese Second Office Action dated Sep. 26, 2022, in Chinese Application No. 201980047912.5, including English translation.

* cited by examiner

CRANK DRIVE WITH PERIODIC CHANGE OF EFFECTIVE LEVER LENGTH

CROSS-REFERENCE TO RELATED APPLICATIONS

This application is the U.S. national phase of International Application No. PCT/EP2019/000223 filed Jul. 18, 2019, which designated the U.S. and claims priority to DE 20 2018 003 342.1 filed Jul. 18, 2018, the entire contents of each of which are hereby incorporated by reference.

FIELD OF THE INVENTION

The present invention relates to a crank drive with periodic change of the effective lever length, in particular on an oval pedal path, as well as associated systems.

BACKGROUND

Repeated attempts were made in the past to change the effectively active lever length in a crank drive, so as to use a longer lever at the time of force delivery (in particular when "kicking down" on a bicycle), and thereby increase the torque. U.S. Pat. No. 4,960,013 describes a telescopic extension of the crank arm in a bicycle. However, this construction is rather complex and susceptible to wear. Known from JP 10-35573 is a crank drive with a control chain that changes the pedal circulatory path into an elliptical shape. Also shown here is a gear configuration with three identical gearwheels, which likely has a high wear, and also has an ergonomically unfavorable movement sequence for the cyclist due to the elliptical pedal path in the dead centers. A more "egg-shaped", oval pedal path would here be desirable, but is not yet known.

The object of the invention is to create a crank drive with a periodic change of the effective lever length, in particular on an oval pedal path, which allows a significant lever extension at a comparatively small size (and weight), and the "man-machine coupling" on the crank drive side to approximate natural walking and running as the result of several movement axes. In particular, conventional dead point zones are to be largely avoided, and the movement sequence (pedal path shape) is to be adjusted to individual needs. In addition, a slim, weight-saving, stable and durable design is to be ensured. Furthermore, associated systems are to be proposed, in particular for sports equipment, in which the proposed crank drive supports a natural movement sequence and/or efficiency.

This object is achieved by a crank drive as well as by the corresponding systems.

SUMMARY

In order to achieve this object, it is provided that a gear lever be mounted at both ends for each crank, which is preferably rotated by a gearwheel drive, so as to increase the length of the effective overall lever (crank arm+gear lever) when kicking down. The gear levers preferably consist of at least three external spur gears, which periodically (during force delivery) are largely arranged in the extension of the respective crank arm, and preferably have a gear ratio (number of teeth) of 2:1:1. The external tooth system results in an inexpensive production and stable design, so that the gearbox can be given an especially compact configuration and easily encapsulated, in particular for optimal lubrication and protection against contamination. In a likewise possible chain or toothed belt drive, a chain or a belt connects two chainwheels or belt pulleys in a gear ratio of 2:1 (as opposed to a 1:1 ratio in JP 10-35573), wherein a tensioning device is also preferably arranged inside of the gear lever shell.

This gear lever design for a bicycle is divided into two movement components according to the invention: On the one hand, a gear lever is arranged on the outer, free end of the crank (partial movement A), wherein the larger spur gear is here preferably non-rotatably connected with the crank arm on the conventional pedal axis. A force introduction part, in particular pedal, non-rotatably connected with the outermost spur gear in the gear lever in conjunction with the overall rotation of the crank drive (crank+gear lever) induces the self-rotation of the gear lever around the spur gear axis of the larger gear wheel. On the other hand, the central movement component arises, in which a gear lever (with integrated gearbox) is coupled at the inner end of the crank (in the center of the crank drive) (partial movement B), wherein the larger spur gear is here preferably non-rotatably arranged with the frame (or machine body) in the area of the pedal crank axis, in particular via a plug, press or screw connection, and thereby ensures that this gear lever rotates around the spur gear axis of the larger spur gear as intended, opposite the rotational direction of the crank. The positive locking of the spur gears ensures a precise periodicity for the change in crank length for both superposed partial movements A+B, so that both partial movements interact to produce the desired, largely oval overall pedal movement. The proposed crank drive is preferably provided as a retrofit kit or for reequipping bicycles, wherein a simplified embodiment also allows for the cost-effective use in various machines (e.g., for energy conversion). In wind or hydroelectric power plants, for example, the crank can be designed as a main blade, which has a gear lever at its outer end resembling a kind of "winglet" or pivotable control flap that can produce significant improvements in efficiency.

A robust, simple, and appealing construction of the gear lever is preferably obtained by respectively arranging the three (or more) gearwheels between two self-supporting, tightly connected flat-oval or flat-pyriform bearing or housing shells as a completely closed housing. As a consequence, the gearwheels are well protected against dirt and water, so as to ensure an optimal lubrication over the long term. A tread crank axis-mounted spur wheel of a multistage gearbox with a reversing stage within a "thicker" gear lever (larger building depth) on the drive side (most often comprised of a bicycle chain) is connected in a simple manner with a chain wheel (for driving the rear wheel). A toothed belt can also be provided to transfer force to the rear wheel of the bicycle. In like manner, a cardan shaft can be coupled with a drive gearwheel (in particular on the pedal crank axis).

BRIEF DESCRIPTION OF THE DRAWINGS

Additional advantages are derived from the following description of preferred embodiments based on the schematic drawings. Shown here on.

DETAILED DESCRIPTION

Figure 1:
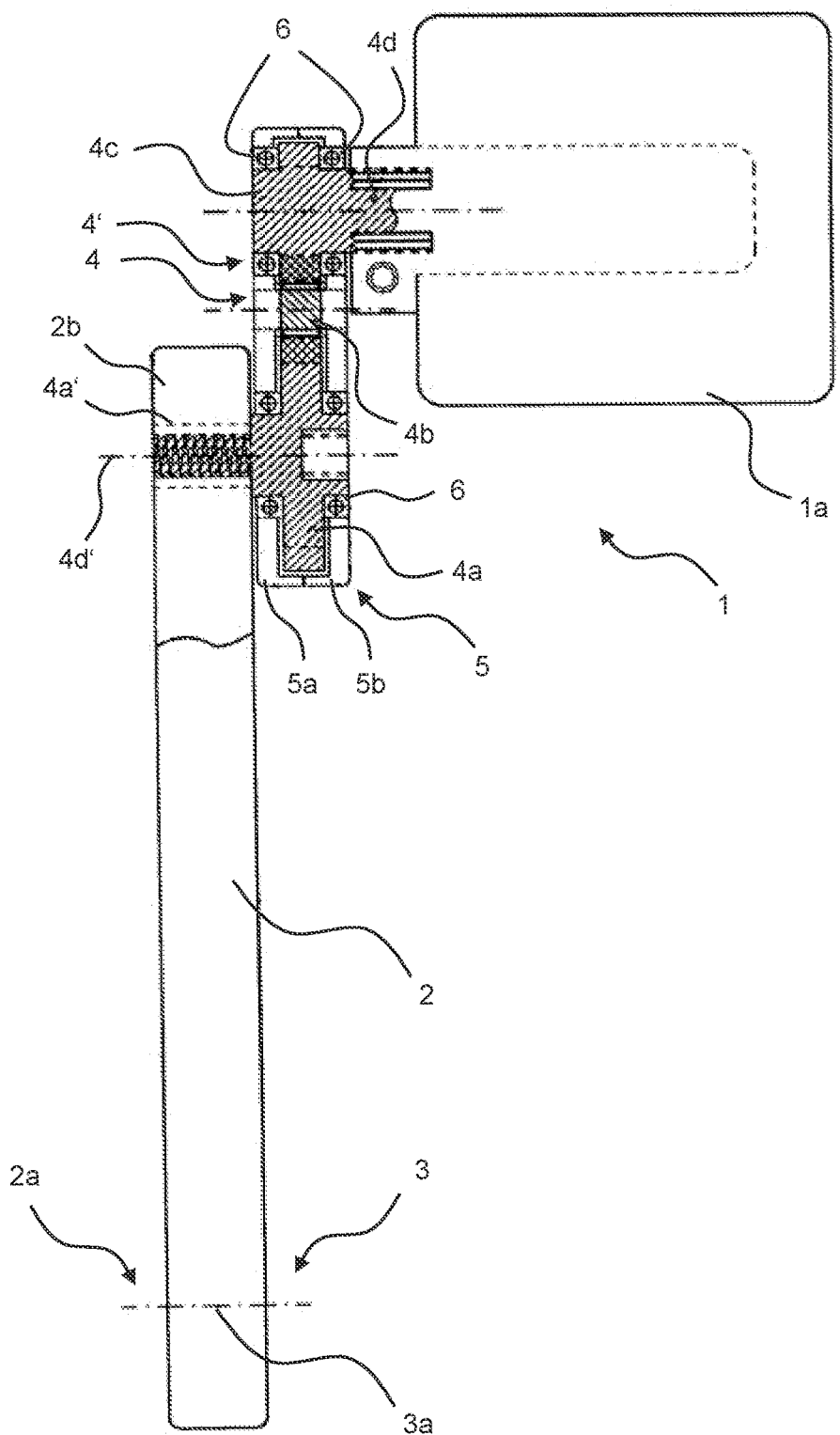
FIG. 1 is a (partially cut) top view of a first embodiment of a component (partial movement A) of the crank drive as used in a bicycle.
Figure 2:
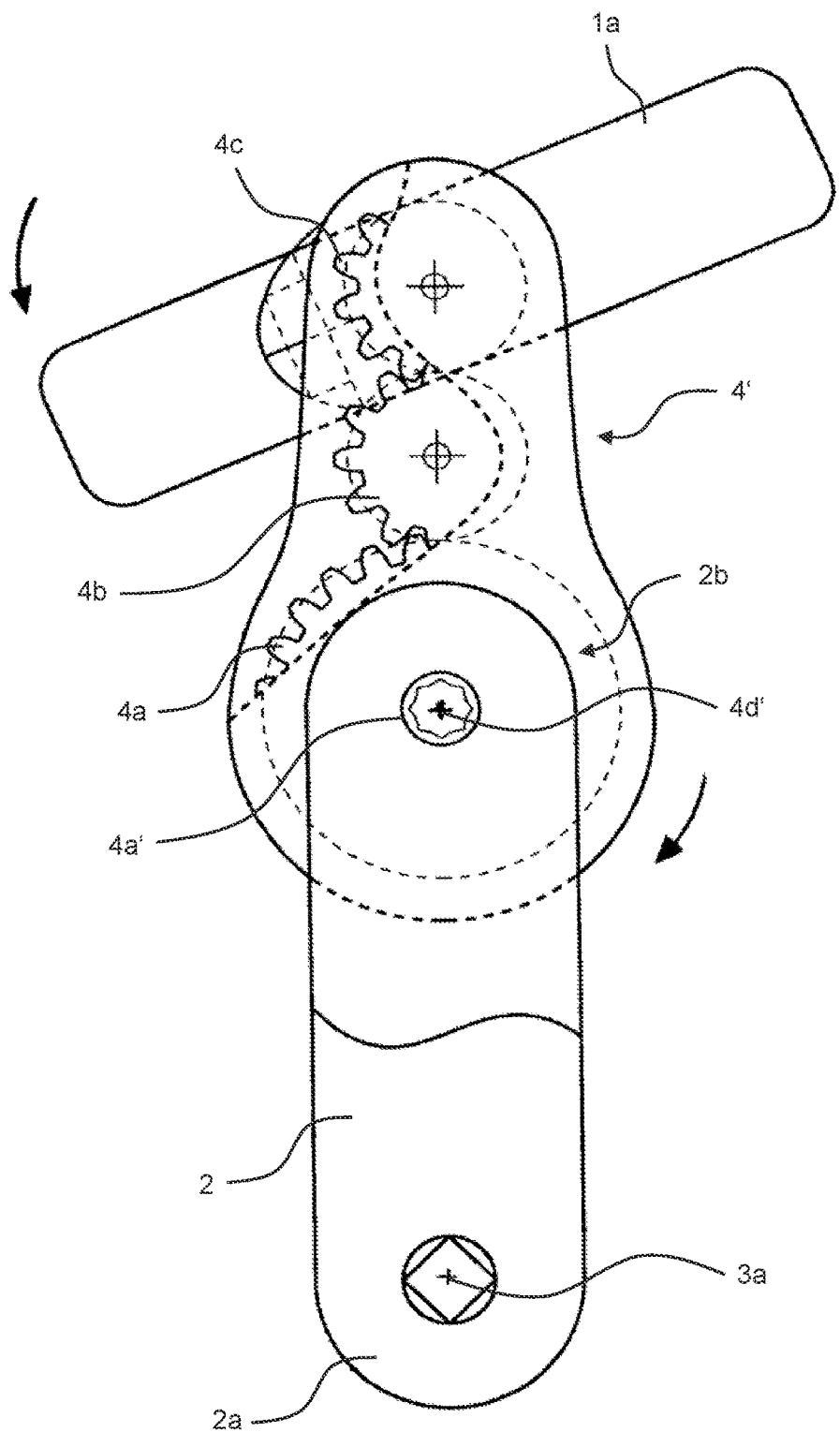
FIG. 2 is a side view of the crank drive component according to FIG. 1.

Schematically depicted on FIG. 1 and FIG. 2 is an exemplary embodiment of a component of the crank drive 1 with a crank 2 according to the invention, wherein only the right crank arm with a pedal 1a as the force introduction part of a bicycle is shown for the sake of simplicity. In this preferred application for a bicycle, the pedaling force F of the rider (see right area on FIG. 3) acts on a shared pedal crank axis 3a over the entire crank drive 1 within a bottom bracket bearing 3 of a bicycle (see also FIG. 4). Since the crank drive 1 can also be used for recumbent bicycles and the like with manual drive, the term bottom bracket bearing 3 or central bearing or shaft bearing 3 is to be used with the same meaning and identical reference number. This also applies to the axis 3a, which on FIG. 1 is only denoted with a dot-dashed line. As mentioned, a second crank 2 offset by 180° with pedal 1a is provided in a conventional manner for a bicycle (compare FIG. 4 or FIG. 7). The outer, free end 2b of the crank 2 is here connected with a gear lever 4' and a gearbox 4 integrated therein in the first embodiment (partial movement A) (FIG. 1 to FIG. 3), while the arrangement for the second component (partial movement B) "is reversed" (see FIG. 4 to FIG. 7), i.e., the "inner" gear lever 7 and the gearbox 4 integrated therein is arranged near to the center (of the total rotation of the crank drive), and the crank arm 2 further toward the outside in a radial direction.

The gearbox 4 here has at least three external spur gears 4a, 4b, 4c. All gearwheels are here mounted in a preferably closed housing 5, and rotate around the larger gearwheel 4a in an epicycloidal manner, rowed together radially to the outside (or as depicted on FIG. 8, at an angle in the housing with a triangular shape). The spur gears 4a, 4b, 4c here comb together so as to permanently mesh (see FIG. 2 with stretched position of the gearbox 4 to the crank 2), wherein an itself rigid (not freely rotating) pedal 1a is non-rotatably connected with the external spur gear 4c for the "orbital" partial movement A, in particular via a preformed shaft extension. The (larger) spur gear 4a is thus fixed relative to the crank 2, and carries two rolling bearings 6 on two ring shoulders. The bearing 6 arranged toward the crank 2 can also be more strongly dimensioned, so as to stabilize the transition between the crank 2 and housing 5, while the other rolling bearings 6 in the housing can be relatively narrow given the lower stress.

Let it be noted that the two rolling bearings 6 to the right and left of the central spur gear 4b can also be replaced by a single bearing, e.g., with a needle bearing bush, and that other bearing types can also be used for the remaining rolling bearings 6. The gear lever housing 5 here with a pyriform design in the side view (see FIG. 2) preferably consists of two flat-oval or flat-oblong housing shells 5a, 5b, so that, after the spur gears 4a, 4b, 4c have been installed, e.g., by bolting, welding, soldering, adhesive bonding, clinching or similar joining processes, the housing can be fabricated as a closed sheath, and thus a tight encapsulation, for the gearbox 4. For example, the housing shells 5a, 5b can be pressed out of sheet metal with the same (mirror-inverted) shape, and thereby be manufactured in a cost-effective and stable manner.

Due to the encapsulation and oblong configuration of the gearbox 4, this part acts as an additional lever on the crank 2, so that the term "gear lever" 4' appears fitting in two respects. Instead of straight tooth systems, the spur gears 4a, 4b, 4c can also have slanted tooth systems or other tooth system types, so that the force transmission is optimized, and gears run more uniformly. The central spur gear 4b here serves to reverse the rotational direction, thereby resulting in the movement sequence according to FIG. 3 described below. The preferred gear ratio or tooth number ratio for the spur gears 4a, 4b, 4c here measures 2:1:1, so that given a rotation of the crank 2 by 90° (around the bottom bracket bearing axis 3a), an additional swiveling (self-rotation) of the oblong gear lever 4' by 90° takes place (around the center of the gearwheel 4a as the rotational axis 4d'). As a whole, then, the angular alignment of the gear lever 4' (relative to the conventional pedal axis) changes by 180° given a 90° rotation of the crank 2.

Figure 3:
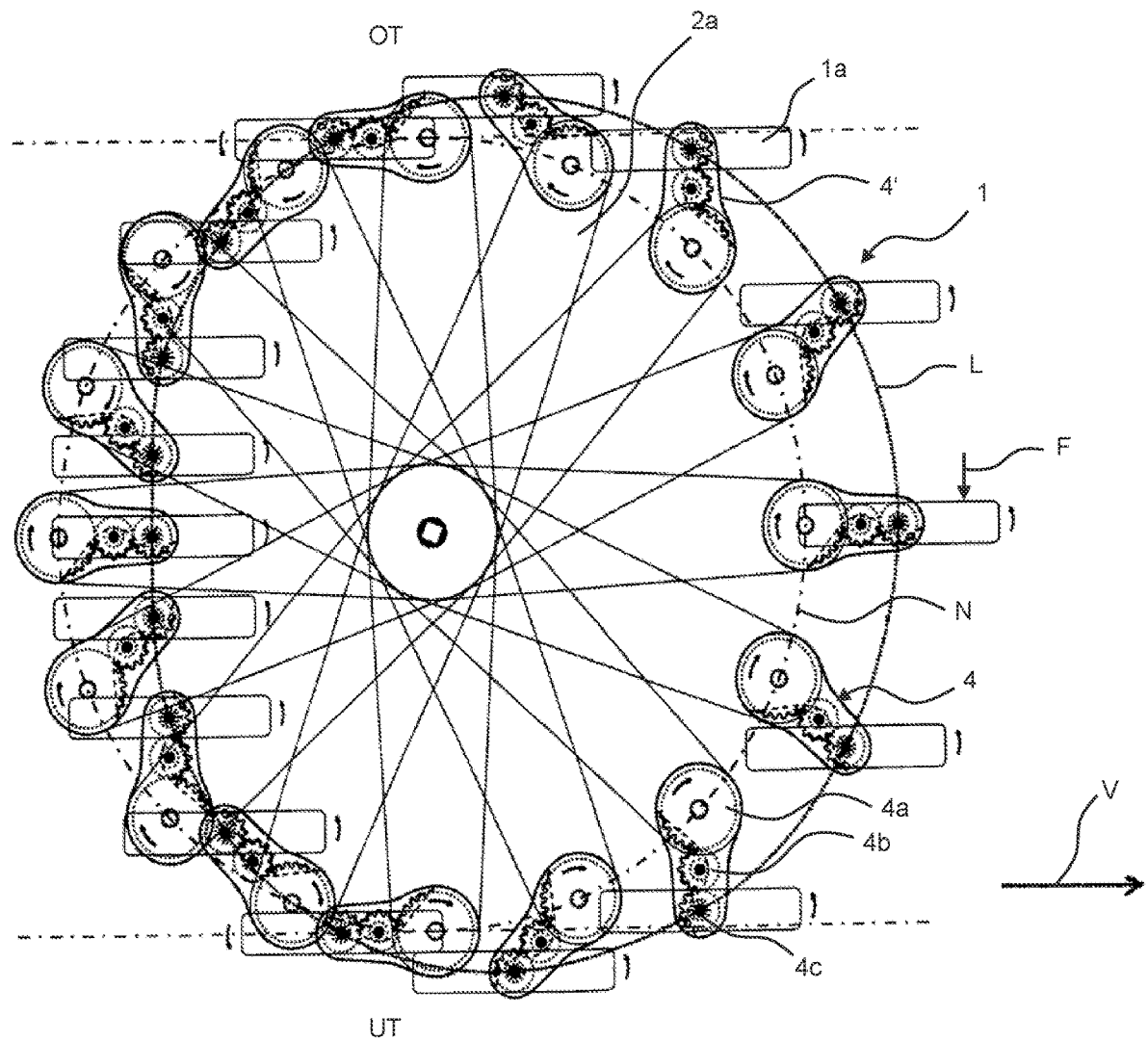
FIG. 3 is a side view of the crank drive (with partial movement A) during a 360° rotation for a bicycle.

On FIG. 3, the traveling direction is denoted with an arrow V, and the dot-dashed circle line N represents the conventional pedal path (=circular arc that would arise around the central bottom bracket bearing 3 during the pedal movement for the conventional pedal axis of the crank 2). This circular movement by 360° here takes place clockwise. In the upper dead point (OT=0 o'clock or 12 o'clock position), the gear lever 4' with the gearbox 4 integrated therein is rearwardly swiveled by about 90° at the upper end of the crank 2, and is then moved into the stretched location according to FIG. 2 via the gearwheel engagement with a gear ratio of 2:1:1 at a rotational angle of 90° (3 o'clock position). In this position, the lever arm is maximal in the partial movement A, since the length of the gear center distance between the gearwheels 4a and 4c in the gear lever 4' is added to the length of the crank arm 2. This yields a circulatory path of movement L offset in the traveling direction V for the application of force on the pedal 1a, as denoted by a dotted path. After further driven by 90°, the crank drive 1 arrives at the lower dead point (UT), which corresponds to a 6 o'clock position. The gear lever 4' is there swiveled by another 180° (i.e., toward the rear wheel for a bicycle) into self-rotation. In the rearward portion of the crank movement while passing from roughly 7 o'clock to 11 o'clock, the gear lever 4' with the pedal 1a is inwardly swiveled in a radial direction, so that the resulting circulatory path of movement L runs inside of the circle line N. This continuous change in the effective lever length of the crank drive 1 during a 360° revolution results in the desired change in the effective lever length in partial movement A, so that the same (pressure) force F acting on the pedal 1a produces a relative torque increase in comparison to the conventional pedal movement. As a consequence, the maximum is reached for the effective lever in the 3 o'clock position on the right of FIG. 3. Because the position of the gear lever 4' has already been rearwardly swiveled by 90° (to approx. the 12 o'clock and 6 o'clock position of the crank 2) owing to the gear ratio of 2:1:1 and given the resultant comparatively large offset owing to the provided axial distance between the spur gears 4a and 4c, the dead point is "toned down" (effective angle between the crank 2 and gear lever 4' measures only approx.) 14° for a standard crank length of 175 mm), which in particular for a bicycle produces an ergonomically advantageous pedaling sequence and opens up the conventional dead point zone to the force application area. However, the decisive gain in torque, and thus power output, is achieved by the fact that the effectively active lever of the crank drive during force delivery (max. in roughly the 3 o'clock position), i.e., while kicking down, is distinctly larger than for conventional crank drives. During a movement from the 6 o'clock position (UT) back into the 12 o'clock position (OT) via the 9 o'clock position, the lever length is partially shortened by comparison to the conventional pedal path N by the displacement of the new circulatory path of movement L in the driving or traveling direction. As a consequence, the increase in effective lever length in the area of the maximum possible (pressure) force delivery that takes place at the crank 2 (in roughly the 3 o'clock position) results in a (relative to the conventional pedal path N) significantly higher torque, and hence power, output given a roughly constant overall pedal path and introduced overall force on the new circulatory path of movement L. The shortened lever produced in the largely passive area (approx. 7 o'clock to 11 o'clock zone) can be advantageously used, e.g., while "turning into the wind" a vane, while a maximum lever length, and thus gain in torque, can be used in the 3 o'clock position given a win direction corresponding to the force arrow F.

As the angular offset arises relative to the (in the 12 o'clock position as reference) position of the gear lever 4' rearwardly swiveled by 90° on the axis 4a' (e.g., also designed as a profile shaft) via the corresponding adjustment (rotation) of the pedals 1a, the pedaling movement path L relative to the circle line N can be varied, or the gear lever 4' twists on the conventional pedal axis relative to the crank position. As a consequence, the "pedal curve" can be individually adjusted to various users and their preferences, and likewise to different application areas (terrain, roads, etc.), and also to the preferred pedaling frequency. The angular offset (e.g., 22.5°) largely depends on the pitch of the mentioned profile shaft or a similarly designed connection between the crank 2 and gear lever 4', and becomes correspondingly finer, e.g., given a larger number of teeth. This allows the rider to individually set a first component (partial movement A) of the proposed crank drive 1 in an easy manner and with minimal expense. This also holds true for adjusting the inclination of the pedal 1a to a corresponding profile toothing 4d.

Figure 4:
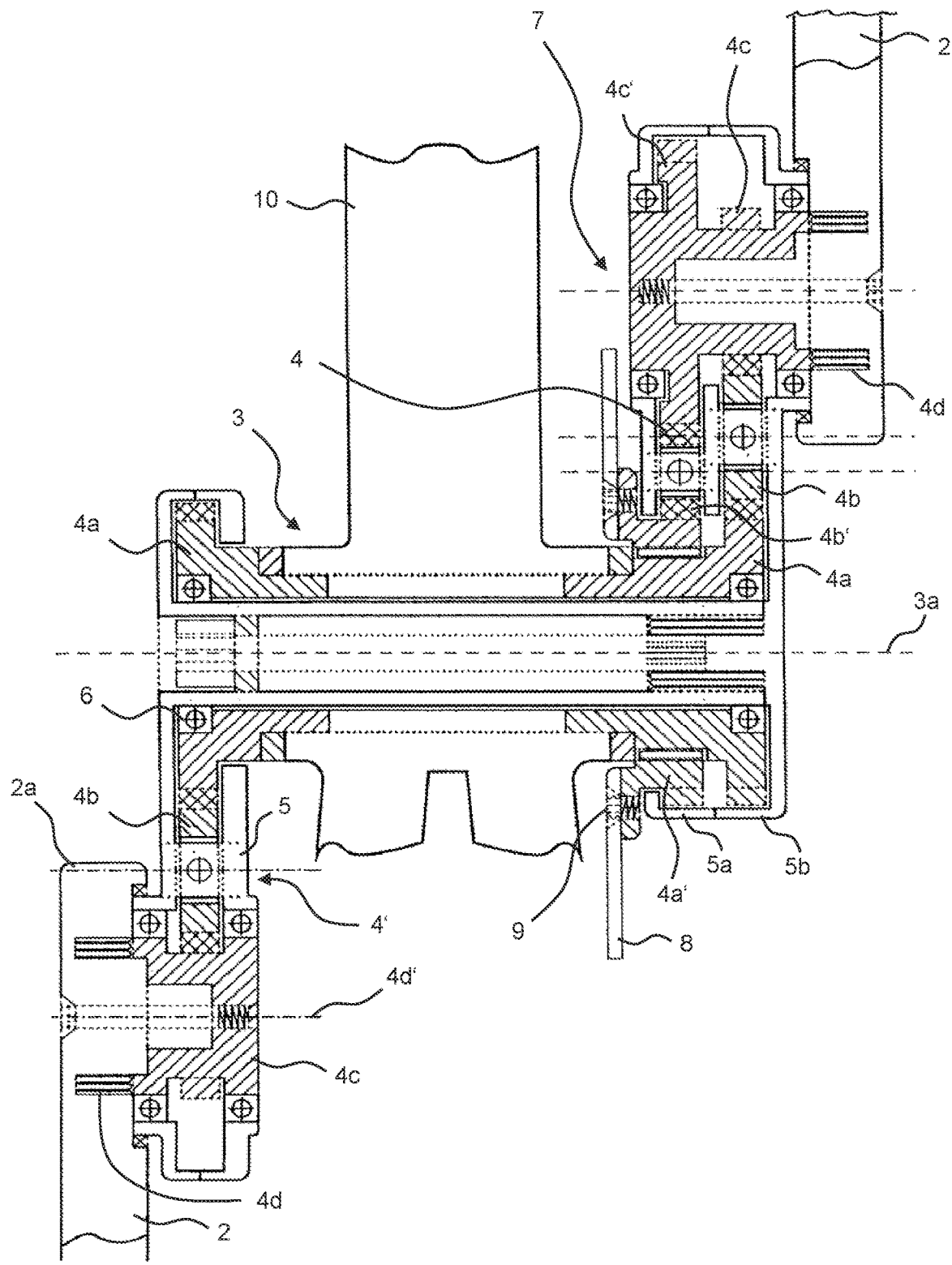
FIG. 4 is a (partially cut) top view of a second component (partial movement B) of the crank drive for a bicycle.
Figure 5:
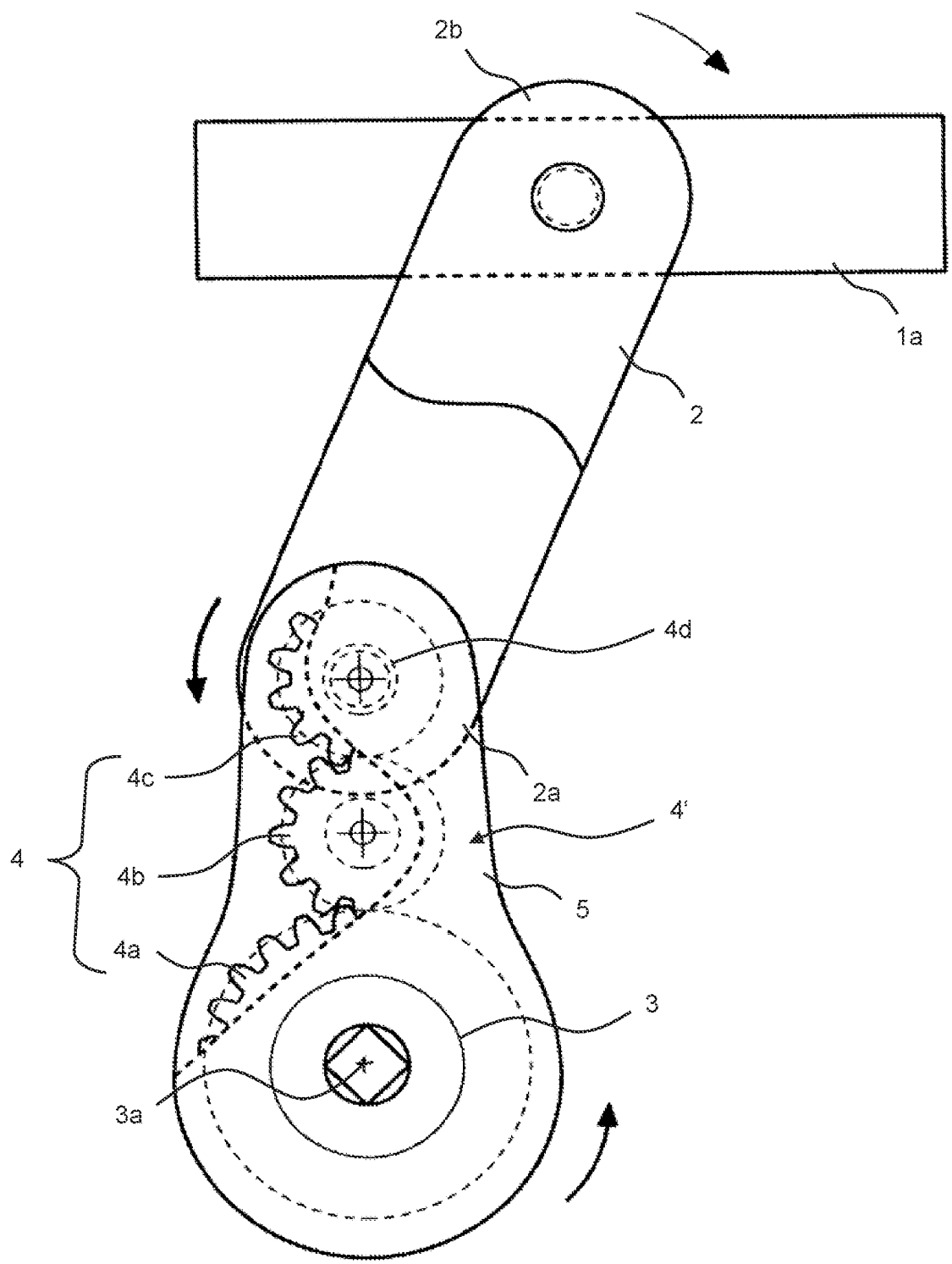
FIG. 5 is a side view of the left half of the crank drive according to FIG. 4.
Figure 6:
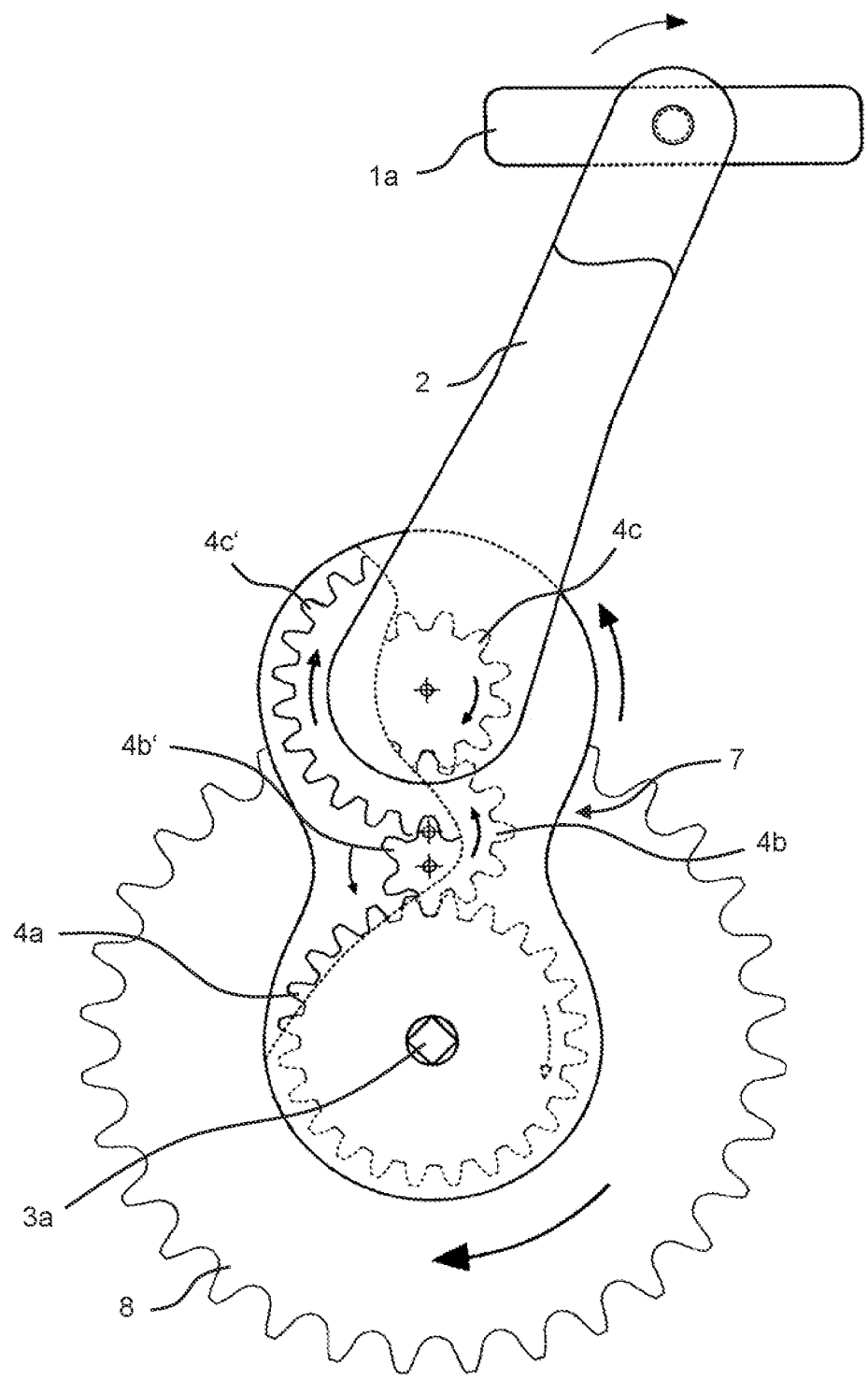
FIG. 6 is a side view of the right half of a crank drive according to FIG. 4.

FIG. 4 and accompanying FIG. 5 or FIG. 6 show a second component (partial movement B) of the crank drive 1, specifically the additional gear lever 7, which has a structural design similar to the already described gear lever 4', unless described otherwise below. While the gear lever 4' is located outside on the free end 2b of the crank 2 in the first embodiment (FIG. 1 to FIG. 3), so as to rotate as a unit in conjunction with the crank 2 during a pedaling movement (specifically in a controlled self-rotation around the center of the spur gear 4a at the outer crank end 2b), the larger, central spur gear 4a is non-rotatably fastened to the frame 10 of a bicycle in the second embodiment, more precisely non-rotatably fastened to the central shaft- or bottom bracket bearing 3 (in particular via an intermediate bushing with shoulder). Arranged on the drive side (i.e., usually with a chain- or belt wheel toward the rear wheel) here is a preferably multistage gear lever 7 (see FIG. 4), to which the chainwheel 8 is also fastened with screws 9. In this way, the three gearwheels 4a', 4b', 4c' (aligned toward the bottom bracket bearing 3 or frame 10) added to the gearwheels 4a, 4b, 4c comprise a preferred reversing stage, wherein the chainwheel 8 is fastened to the spur gear 4a', which is mounted on the shaft extension of the spur gear 4a leading toward the bottom bracket bearing 3, in particular in conjunction with an intermediate bushing (see FIG. 9), and drives the chain in a conventional manner despite the counter-rotating inner gear lever 7, since the reversing stage is precisely provided. When taking off the gear lever 7, the (front) chainwheel 8 (see FIG. 4 or FIG. 9) can also be easily replaced if a different gear ratio is desired for the chain or belt drive.

On the (chainless) non-drive side (=left side of FIG. 4; see also FIG. 5), a gear lever 4' formed similarly to FIG. 2 is sufficient for attachment to the bottom bracket bearing 3, wherein the inner spur gear 4a is once again (as on the right side) fixed relative to the frame 10, while the outer spur gear 4c is non-rotatably connected with its axle with the inner end 2a of the crank 2, such that it can preferably be adjusted with a profile toothing 4d. A pedal 1a can also be secured to the free end 2b of the cranks 2, as shown on FIG. 6, wherein the pedal 1a—as commonly the case in bicycles—can also be freely rotating, while the alignment of the pedals is adjusted in the orbital configuration according to FIG. 1 to FIG. 3 (but can also be preset in terms of inclination with the profile toothing 4d).

FIG. 4 (and FIG. 5) show the respective three spur gears 4a, 4b, 4c of the gear lever 4' or 7 in meshing engagement with a gear ratio of 2:1:1, as denoted with crossing lines between the mentioned spur gears. Similarly to FIG. 1, these spur gears are mounted with corresponding bearings 6 inside of the gear lever housing 5 with half shells 5a, 5b. This half-shell design can also be used for the "central" gear lever 7 (with additional gar ratios and integrated reversing stage by comparison to the gear lever 4') on the right drive side on FIG. 4 (see also FIG. 7 or FIG. 9). Instead of the chainwheel 8 that is fastened with screw bolts 9 to the side lying toward the frame 10, use can also be made of a toothed belt wheel for driving the rear wheel by means of a toothed belt.

Impinging on the pedal 1a imparts rotation to the crank 2, and the two spur gears 4b, 4c roll relative to each other in the housing 5 of the gear lever 4' formed in this way around the larger spur gear 4a (likewise in the "wider" gear lever 7, which for purposes of reversing the rotational direction here also contains the spur gears 4a', 4b', 4c' as a second gearwheel plane toward the frame 10), wherein this spur gear 4a has twice as many teeth as the spur gears 4b (as an idler gear) and 4c (as a coupling gear toward the crank 2). This in turn makes it possible to achieve the periodic change in effective crank drive length of the effective overall lever, comprised of the crank 2 and the gear levers 4' and 7. In order to adjust the accustomed height of the pedals according to the circle line N (see FIG. 3 and FIG. 8) in the conventional dead points (6 and 12 o'clock position), it is advantageous in the central embodiment to lengthen the cranks 2 by (roughly) the amount of the axle differential between the larger gearwheel 4a and the external gearwheel 4c on the gear lever 4'. This lengthening in the combination A+B can also open up dead point zones to the force application area that are otherwise hardly ever used in the pedal path. Without a combination (central and orbital movement portion), this only applies in relation to the extent that an angular offset is set in between the crank lever 4' or 7 and crank 2 (in the 12 o'clock position as the reference position). Given a longer crank 2 relative to the central gear lever 4' or 7, the gear lever 4' or 7 performs a rotational movement proportionally opposite the overall crank movement on the inner crank end 2a in the central embodiment (impinging the pedal 1a causes the crank 2 to here twist the inner gear lever 4' or 7 proportionally to the opposite and equiangular twisting of the crank), while the drive lever 4' or 7, for example, is situated in the direction opposite the crank 2 in the OT (12 o'clock position of the pedal) and parallel to the crank 2 in the 3 o'clock position, and thus periodically induces a doubling in lever length there (central gear lever axle differential 4a to 4c+amount of crank extension). In this central embodiment, the lever length is significantly changed in a targeted manner both in the downward movement of the pedal (during the usual force delivery) and in the upward phase of the respective pedal. When using foot fixation systems on the pedal 1a (clipless pedals, pedal shoes, and the like), this means that the central movement portion can here also be utilized in the area of the so-called raising of the pedals so as to increase the torque. As a result, given only a disproportionately longer overall path of the pedal movement path (relative to the circle path N as the conventional pedal path) depending on the crank extension amount, the new movement path L (with an overall lever periodically lengthened at the time of force delivery) in turn yields a significant increase in torque at the same force delivery and an only disproportionately longer circulatory path of the force application part (pedal), and hence a higher total output per crank revolution (naturally, most often of the two cranks in a bicycle), as shown in detail on FIG. 8.

FIG. 5 presents a side view of the left area on FIG. 4, i.e., the so-called non-drive side (without chainwheel). The circulatory path of movement L of the pedals that arises in this central arrangement of a gear lever 4' or 7, more precisely the location of the maximum achievable, orbital eccentricity and location (to the horizontal) of the pedal path of movement, can on the one hand be individually set via alignment preferably in the OT (always proceeding from the basically opposing position there) between the (outer) crank 2 and the (centrally inner on the bottom bracket bearing 3) gear lever 4' or 7, e.g., by way of a profile toothing 4d (see also reference number 4d on FIG. 4). Shown here on FIG. 5 is a "kinked" alignment of the crank 2 in the OT (or 12 o'clock position) by 22.5° to the alignment of the oblong housing 5 of the gear lever 4'. If desired, the crank 2 can also be aligned in an extension of the gear lever 4' or 7, or be "kinked" incrementally with the profile toothing 4d at another suitable angle. As stated above, this kink angle here largely depends on the pitch of the profile toothing 4d on the spur gear 4c leading to the crank 2. In this example, the profile toothing preferably has 32 teeth, but can also have a higher number of teeth, so that the settable kink angle can be varied even more finely (e.g., by 11.25° given 64 teeth). This "kinking" can also influence the location of the most effective lever, so that its location "wanders", e.g., from the 3 o'clock position (on FIG. 3) in the direction toward the 2 o'clock position, which can be advantageous for various applications and the ergonomic activation of the crank drive 1. On the other hand, in particular the proposed combination (see FIG. 7, FIG. 8, or FIG. 10) with the orbital gear lever 4' at the outer crank end 2b of the crank 2 can be used for additionally varying the circulatory path of movement L of the pedals, wherein the gear lever 4' can also be rigidly installed (e.g., without a complete gearbox 4, and hence without any self-rotation around the spur gear axis) in a specific angular adjustment with conventional (freely rotating) pedals as the crank extension.

FIG. 6 presents a side view of the drive side with the gear lever 7 shown on the right of FIG. 4, which here has an octagonal external appearance, but is preferably configured with a flat-oval shape (see FIG. 9) for installing a reversing stage. To this end, a larger spur gear 4c' is arranged in the gearwheel plane toward the frame 10, which here once again has the same number of teeth as the immobile spur gear 4a. The crank 2 is preferably detachably (press, plug, or screw connection) connected in particular via an intermediate bushing with the spur gear 4c, wherein the latter carries a larger spur gear 4c' in the inner gearwheel plane, which engages with a spur gear 4a' (with the same number of teeth as the spur gear 4a, and thus shown congruently with the latter in the side view) by way of a smaller connecting gear 4b'. In this arrangement and the selected tooth number ratio for the spur gears 4a, 4b, 4c and 4a', 4b', 4c', it is ensured that a chainwheel connected with the spur gear 4a' by screw bolts 9 (see FIG. 4) rotates in the same direction as the crank 2 (as commonly the case for bicycles), even though the central gear levers 4' or 7 for turning the cranks 2 behave oppositely. This reversal is here of independent, inventive significance. Here as well, the external crank 2 relative to the central gear lever 7 (also 4') is shown angled in relation to the alignment of the gear lever 7, wherein this "kinking" can once again be individually adjusted, similarly to the non-drive side, so as to vary the relative position of the largest effective lever (e.g., in the area of the 3 o'clock position), and hence the area of the maximum torque increase as well as the progression of the circulatory path of movement L (see FIG. 3 or 8) and its location in relation to the horizontal. Similarly to the proposed combination with the orbital gear lever system on the outer crank end 2b of the crank 2, the angular position between the crank 2 and the central gear levers 4' and 7 makes it possible to minimize the scope of conventional dead point areas and individually adjust the use of the dead points for force application.

Figure 7:
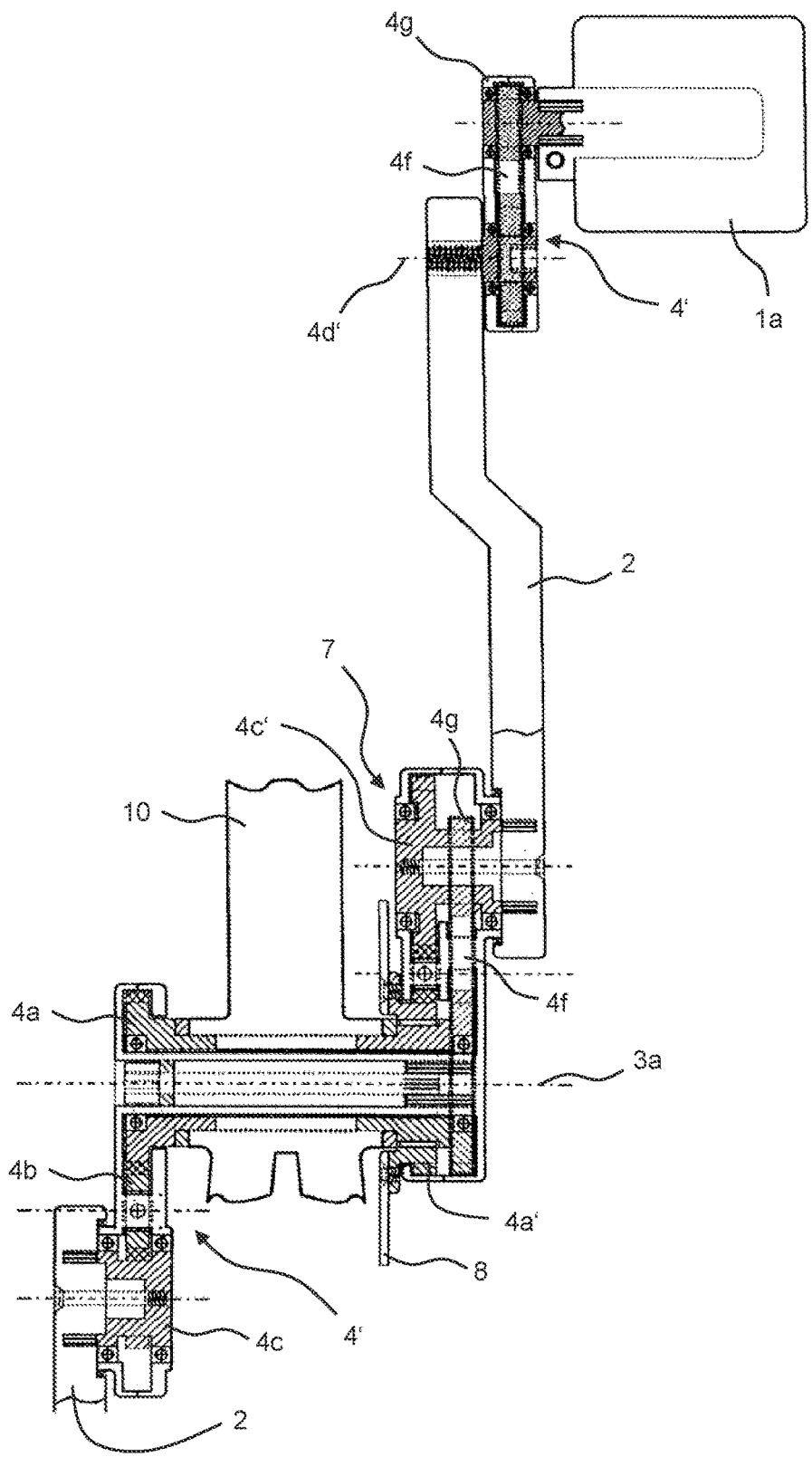
FIG. 7 is a combination of the crank drive components A+B for a bicycle.

FIG. 7 shows the especially effective combination of the two embodiments (crank 2 with central and orbital gear lever 4' or 7). In particular, an inwardly (in the direction of the bicycle frame 10) cranked crank 2 is here intended to produce a smallest possible transverse pedal distance (Q factor), wherein the inner side of the outer crank end 2b facing the frame 10 moves relative to the inner crank end 2a on roughly the same rotational plane, or even one lying further inward on the frame side. The respective crank 2 can here be at least partially designed as a tubular hollow body (see FIG. 10), which completely or partially envelops bearing seats on a half shell 5a or 5b and shaft extensions of the spur gears 4a, 4a' or 4c. This allows the outer, orbital gear lever to barely protrude over the outer contour of the crank 2.

However, the crank 2 can basically also have a conventional design. As a(n at least) partial replacement for the spur gear drive 4a, 4b, 4c, a chain- or belt drive 4f is here additionally denoted inside of the gear lever 4', likewise for the gear lever 7, wherein a chainwheel or belt wheel 4g is inscribed in the same axis (in particular toward the outer gearwheel 4c' of the reversing stage). In this way, the gearwheel drive and chain drive can be combined with each other in the gear lever 7 for reversing the rotational direction of the chainwheel 8 on the drive side.

Figure 8:
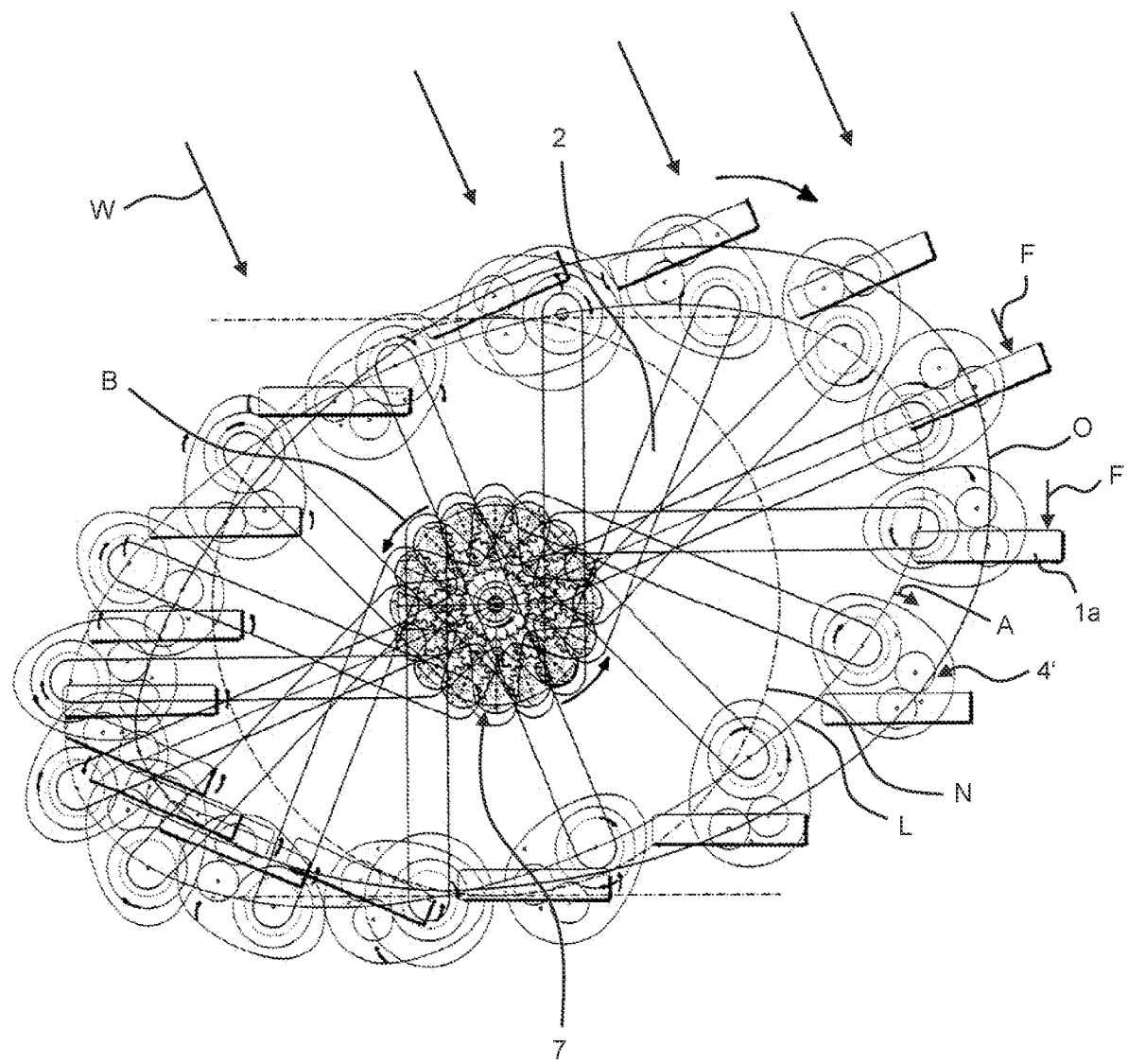
FIG. 8 is a side view of the overall movement (comprised of partial movement A and B) during a 360° rotation for a bicycle.

Aside from the conventional pedal path N (see FIG. 3), FIG. 8 shows the resulting, desired oval path of movement O of the entire crank drive 1 (according to FIG. 7, composed of a central and orbital movement component of the drive lever 7 and 4') in combination with the crank 2. The orbital gear levers 4' are here egg-shaped in design, wherein the spur gear train 4a, 4b, 4c (or also the belt drive 4f) is angled. As evident by comparison to the also drawn elliptical circulatory path L (with only one gear lever, see FIG. 3), the double arrangement, meaning a central gear lever at the inner crank end 2a and an orbital gear lever at the outer crank end 2b, yields an additional lever extension (at most roughly in the desired 2 to 3 o'clock position, with high force application F on the pedal 1a), while the overall lever length is minimized in the passive zone (about 9 o'clock). This yields an optimal power given an ergonomically favorable movement, in particular with a reduction in dead point zones. Let it be emphasized that an inclination of the pedal surface (to the horizontal) arises during the transition from the 6 o'clock to the 9 o'clock position, which then transitions from the 12 o'clock position to the 3 o'clock position with an opposite inclination. This results in an optimal adjustment to the force application (direction of the leg force of a cyclist). The outermost edge of the pedal 1a is aligned toward the top right in the 2 o'clock position, so that the pedal surface is roughly at a right angle to the stretching movement of the cyclist leg in this position (see upper force arrow F). During transition to the 3 o-clock position, the pedal 1a swivels into the horizontal due to the forced control of the gearbox, and thus in the optimal direction for introducing force when the cyclist kicks down.

This movement sequence can advantageously also be used for wind turbines or hydroelectric wheels, wherein the cranks 2 (possibly also the orbital gear levers 4') can carry the corresponding wing profiles. For example, if the wind (marked W) blows from the top left, the yield in the 2 to 3 o'clock position is especially large owing to the maximum lever extension there, while turning back into the wind (left half of FIG. 8) is relatively energy-saving (minimal lever arm and favorable alignment analogous to the pedal surface).

Figure 9:
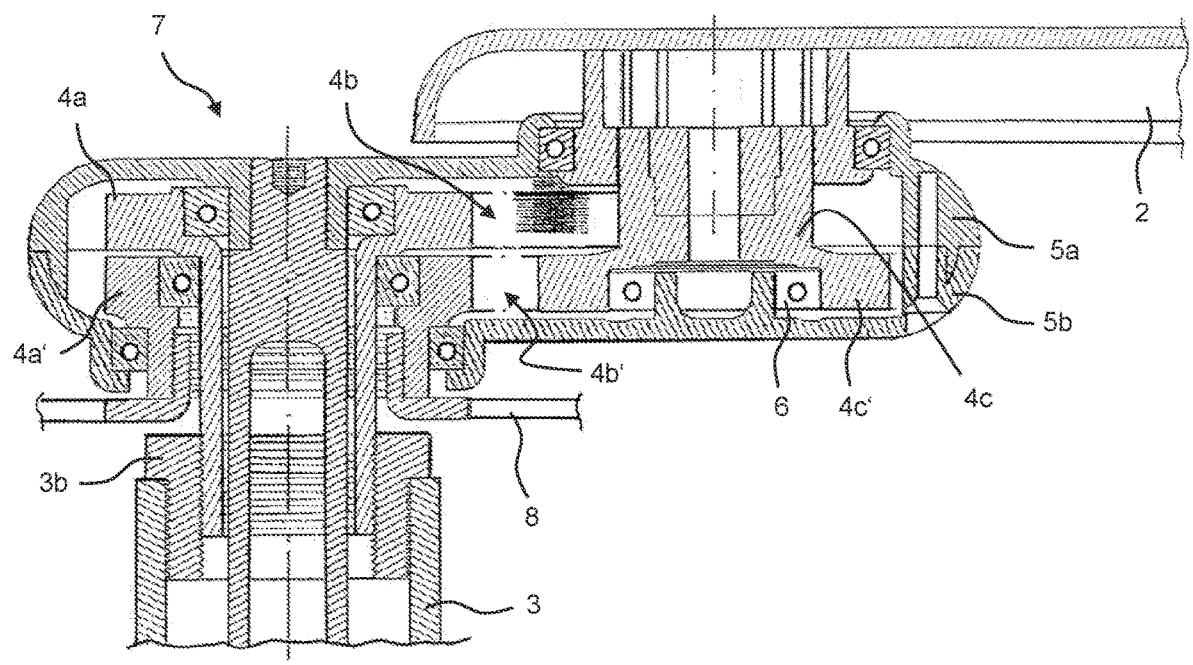
FIG. 9 is a longitudinal section of the central arrangement in the area of the bottom bracket bearing.

FIG. 9 presents a longitudinal section showing how the gear lever 7 is attached to the central bottom bracket bearing shaft 3a. Similarly to FIGS. 6 and 7, a crank 2 here facing right with a profile toothing 4d is placed on the spur gear 4c. The idler gears 4b and 4b' shown on FIG. 6 are here not shown for the sake of clarity. The larger spur gear 4a is non-rotatably anchored to the bottom bracket bearing 3 via a tubular extension and an intermediate bushing 3b, while the spur gear 4a' of the reversing stage is rotatably mounted on the mentioned tubular extension, and guided toward the chainwheel 8. The gearwheels 4a' and 4c' of the reversing stage are the same size, and coupled via the idler gear 4b' (shown on FIG. 6) (ratio 1:1, while the here upper spur gear group 4a, 4b and 4c has the tooth number ratio 2:1:1). The gearwheel 4c' is coupled with the spur gear 4c in the same axis, and stably mounted in the half shells 5a, 5b via sealed bearings 6. This design allows the gear lever 7 to be easily mounted on the bottom bracket bearing 3, and gives it a narrow shape, including in particular due to the bearings 6 introduced recessed radially inside the tooth tread.

Figure 10:
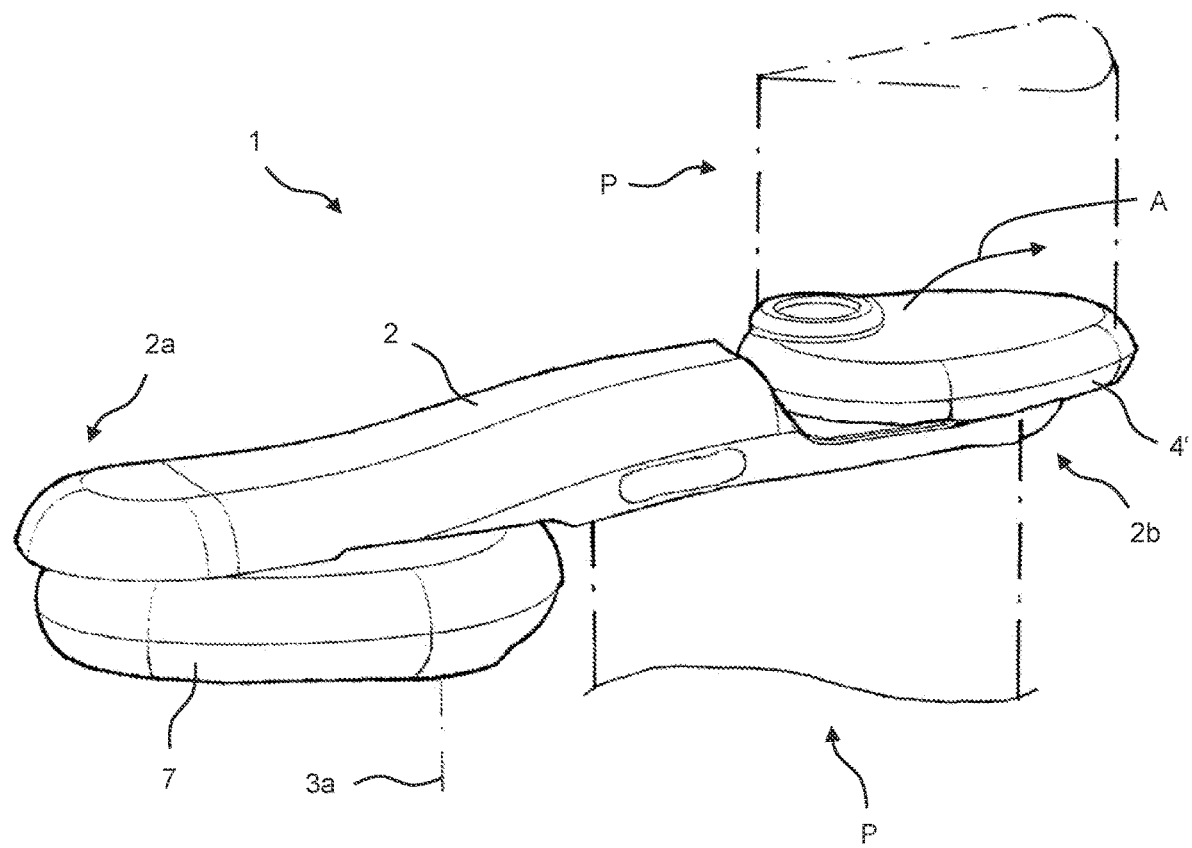
FIG. 10 is a 3D view of the crank drive.
Figure 11:
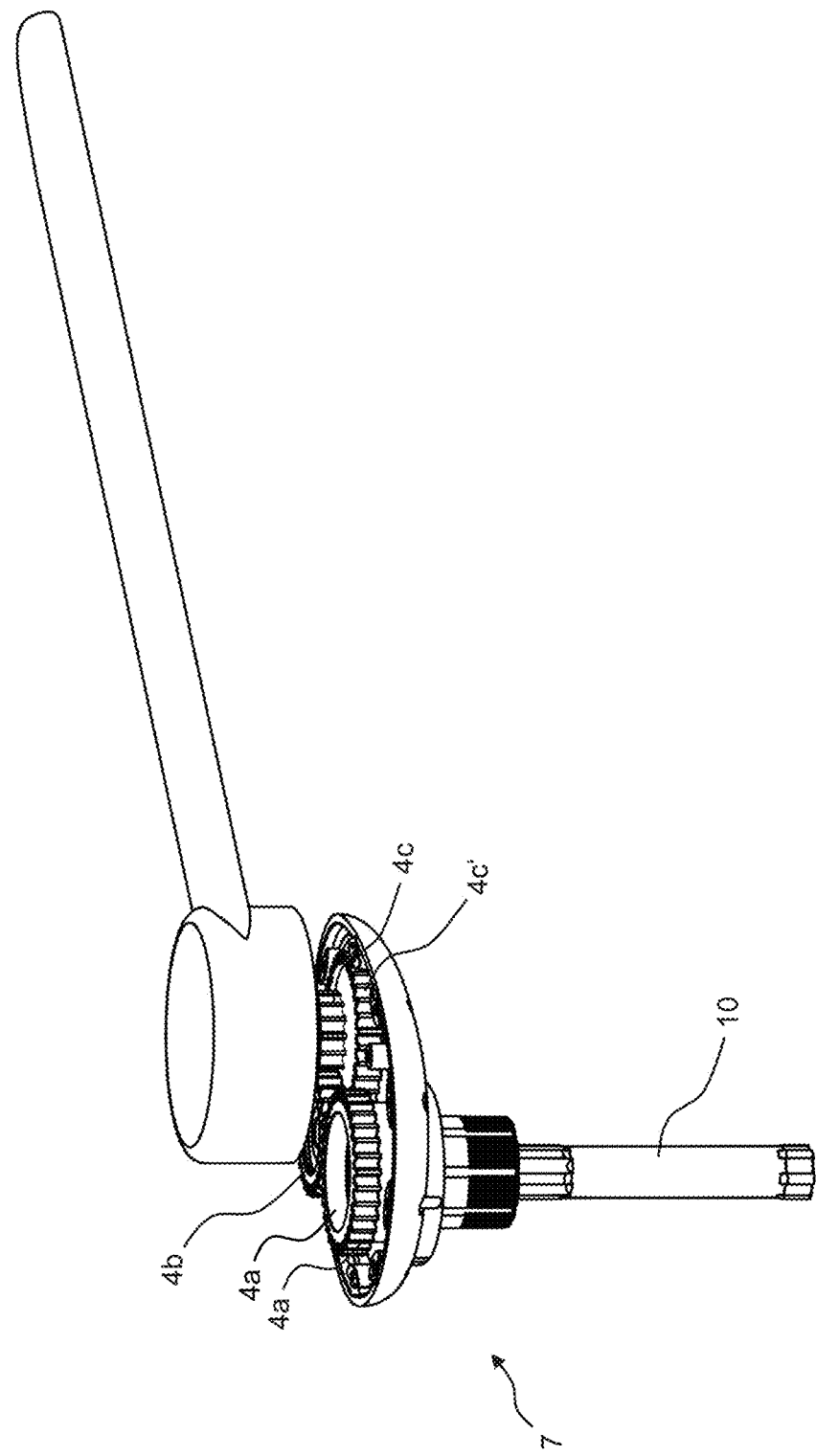
FIGS. 11 and 12 are perspective views of a crank drive suitable for use in or on a power generating machine, wind turbine, or hydroelectric wheel and having an external appearance shaped at least partially as a ventilator, propeller or rotor blade.
Figure 12:
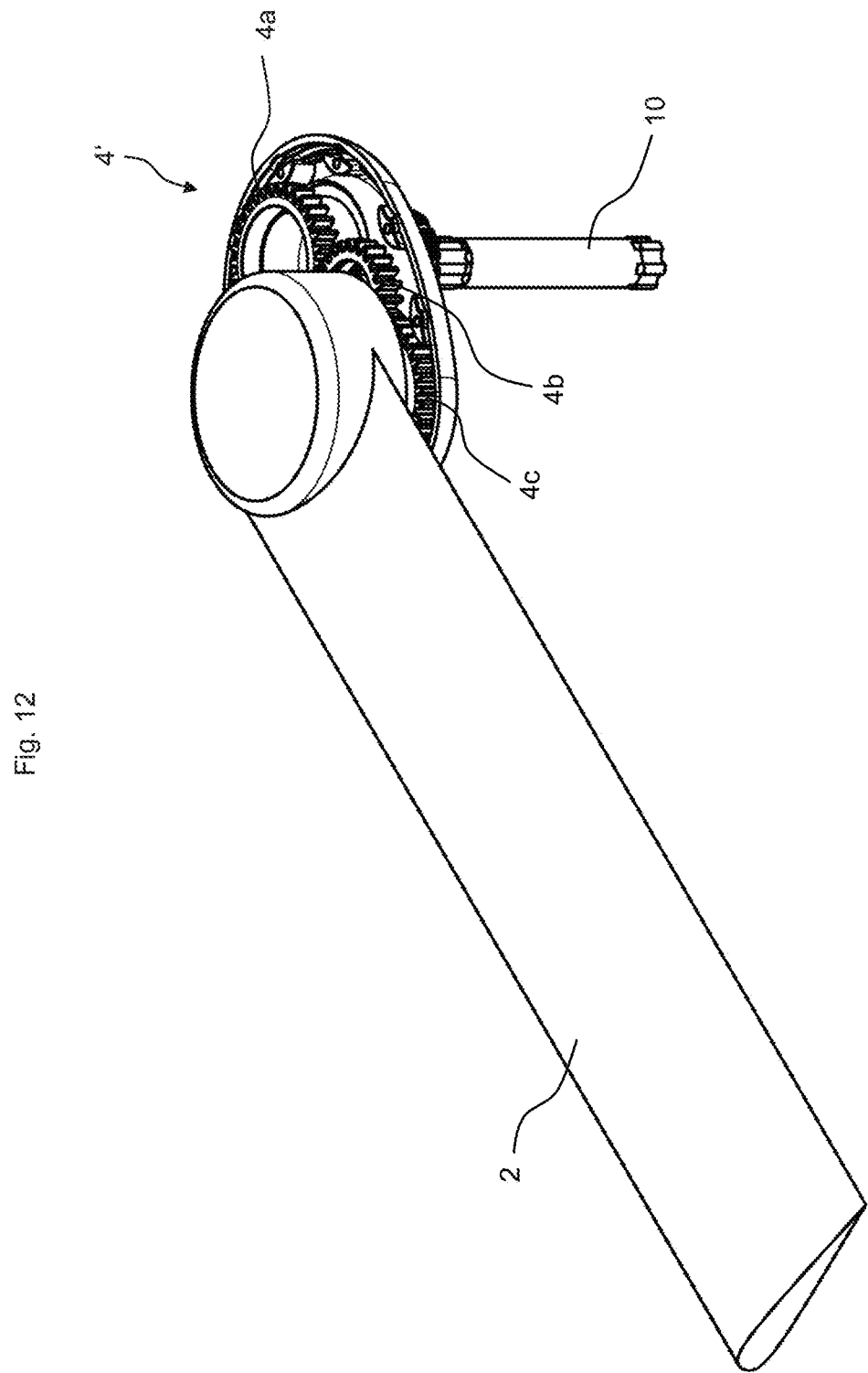
Figure 13:
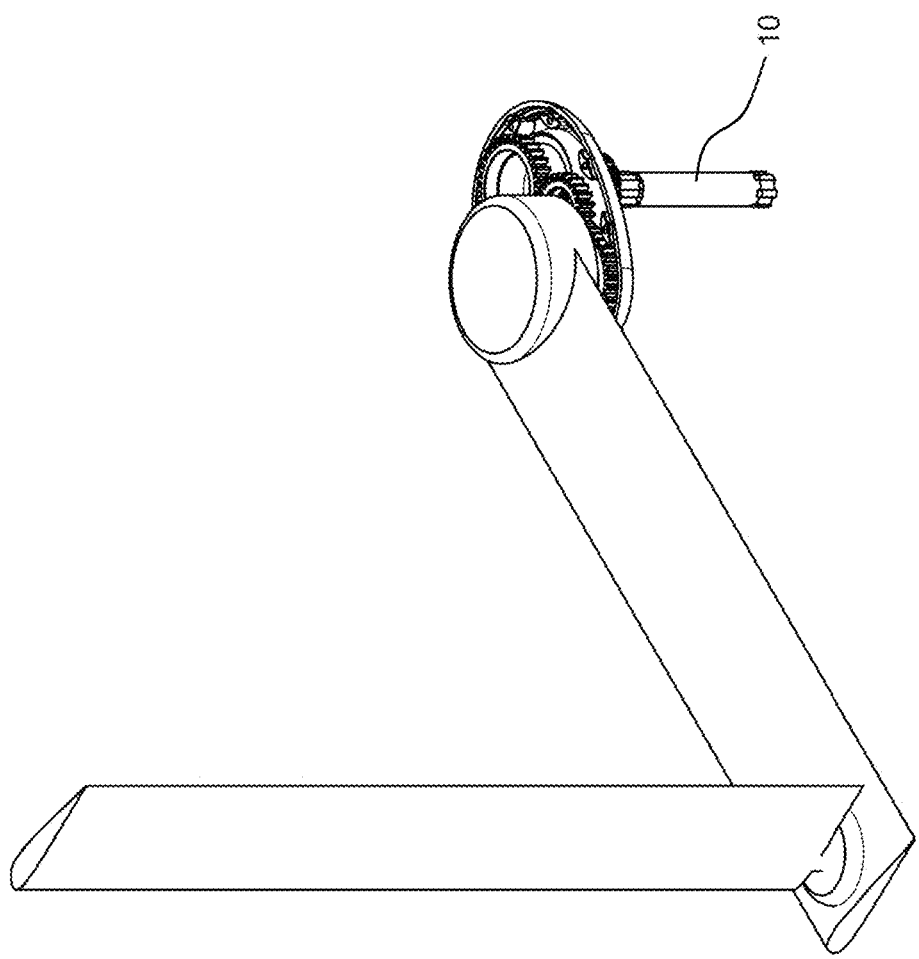
FIG. 13 is a perspective view of a crank drive suitable for use in or on a power generating machine, wind turbine, or hydroelectric wheel and having an additional wing profile and agitator.
Figure 14:
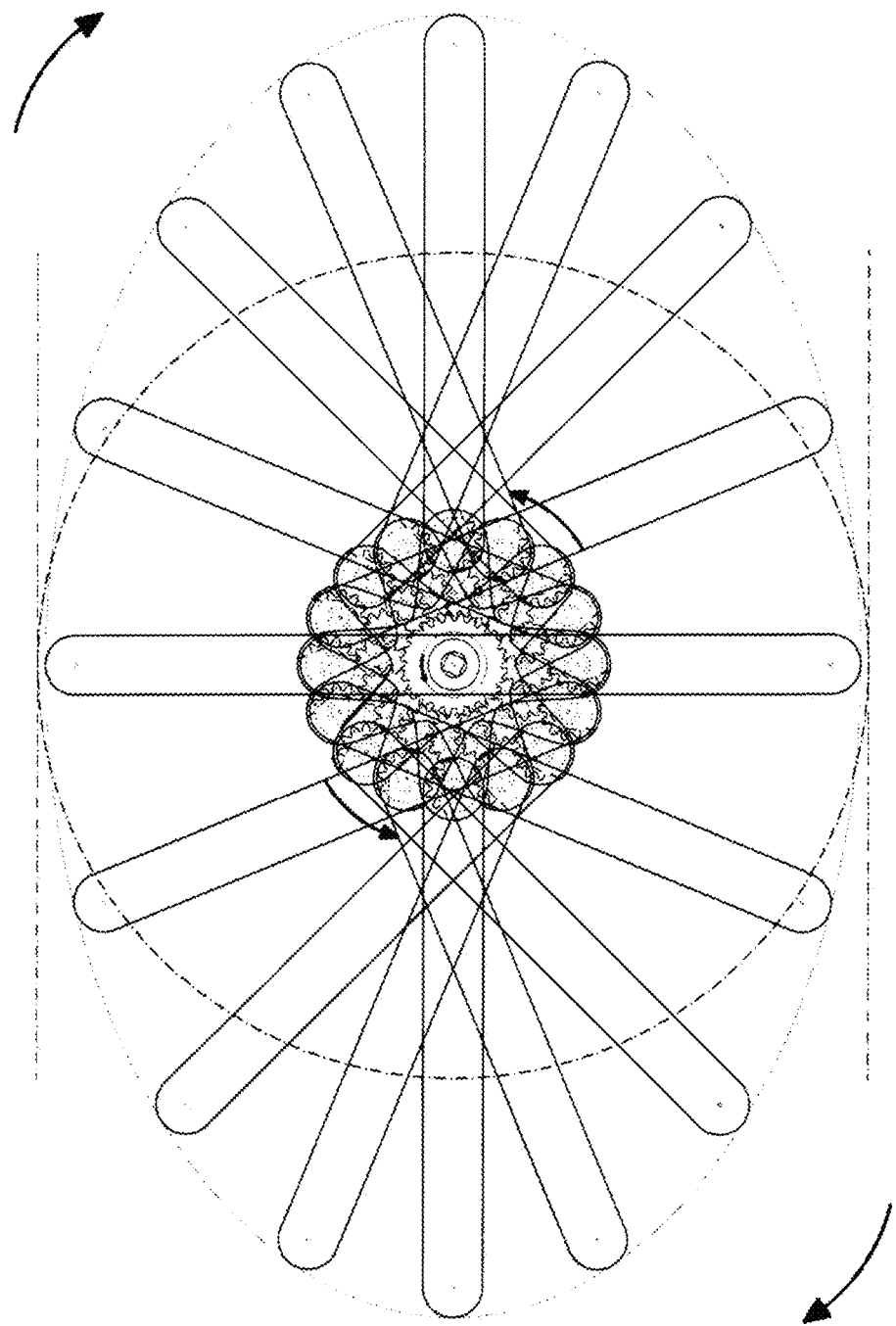
FIG. 14 is a top view of overall movement of the crank drive of FIGS. 11-13 during a 360° rotation.

FIG. 10 presents a 3D view of the crank drive 1 in its "collapsed" length, wherein the orbital gear lever 4' (here on the right) and the wider, central gear lever 7 (here on the left) extend along the cranked crank 2. The latter is preferably hollow cast out of a light metal, while the housing of the gear lever 4' and 7 is preferably manufactured out of plastic (in particular high-strength polyamides or reinforced with glass or carbon fibers). This makes it possible to achieve a streamlined outer shape, and also to easily mold on wing profiles for use in wind or hydroelectric power plants, as denoted in dot-dashed lines toward the bottom on the crank 2 and toward the top on the orbital gear handle 4'. The wing profile P works particularly effectively given outwardly protruding gear levers 4' (see 2 to 4 o'clock position on FIG. 8), while less torque is required during the reverse rotation (left half of FIG. 8). This concept can also be used in this way on or in propellers, ship's propellers, turbine blades and other crank drives (e.g., in conveyor systems, spooling devices or agitators), as well as piston engines, steam engines, and the like, so as to achieve a higher torque, better overcome the respective dead points, improve the start-up behavior, cut noise emissions or reduce the necessary driving force. This allows a higher output and lower fuel consumption and emissions (environmental protection). In particular with respect to agitators, the distinctly and periodically altered lever length (possibly with mixing profiles similar to the preceding wing profiles P) makes it possible to achieve a very good mixing of a surrounding fluid, wherein the motor drive is flanged on the central axis 3a (instead of a generator for wind or hydroelectric power plants).

The invention claimed is:

1. A crank drive with periodic change in an effective lever length for an oval path of a pedal or an element of force-application, with at least one crank with an outer end and an inner end,
    a gear lever being arranged on the crank at both the inner end and the outer end, respectively, wherein the gear levers are comprised of three externally toothed spur gears, wherein one of the spur gears is coupled to the crank with its rotational spur gear axis, and another spur gear is non-rotatably connected with a frame or the pedal, as well as that one of the two gear levers performs an opposite self-rotation relative to a rotational direction of the crank.

2. The crank drive according to claim 1, wherein the two gear levers each have an oval or pyriform housing comprised of two half shells, which forms a dustproof and/or watertight encapsulated unit, into which rolling bearings are pressed to support the spur gears.

3. The crank drive according to claim 1, wherein a pedal position of the pedal, which is non-rotatably adjusted to the spur gear connected with the pedal of the gear lever arranged at the outer end of the crank, can be adjusted through implementation on a profile toothing or subsequent turning of a ratchet, making it possible to set an angular position of said gear lever relative to the crank.

4. The crank drive according to claim 1, wherein the position of the crank relative to its vertical alignment can be adjusted by subsequently turning a ratchet or implementing a profile toothing, making it possible to set an angular position of the gear lever on a side of the crank that is adjacent the frame.

5. The crank drive according to claim 1, comprising a wing profile on at least one of the crank and the gear lever, wherein the crank drive is used in or on a power generating machine, a wind turbine or hydroelectric wheel.

6. The crank drive according to claim 1, comprising a wing profile on at least one of the crank and the gear lever, wherein the crank drive is used in or on a ventilator, propeller or rotor, wherein an external portion of the crank drive is configured as at least one of a ventilator blade, a propeller blade, and a rotor blade.

7. The crank drive according to claim 1, comprising a wing on at least one of the crank and the gear lever, wherein the crank drive is installed in or on an agitator for gasses, liquids and solids, for at least one of food production, beverage mixing processes, fermentation processes, waste processing (sewage treatment plants) and chemical preparation.

8. The crank drive according to claim 1, wherein at least one of said spur gears has recesses within one of the gear levers that reach laterally under a running surface of a toothing system for pressing in rolling bearings.

9. The crank drive according to claim 1, wherein the crank is extendable, by an axle differential of the spur gears in one or both of the gear levers, so as to induce a corresponding lever extension in a 3 o'clock position.

10. The crank drive according to claim 1, wherein the non-rotatable spur gear is detachably fastened to the frame.

11. A crank drive with periodic change in an effective lever length, for an oval path of a pedal or an element of force-application, with at least one crank with an outer end and an inner end and a chainwheel, wherein a gear lever is designed as a multistage gearbox with a first stage and a reversing stage, the first stage and the reversing stage both having a crank-sided spur gear, a chainwheel-sided spur gear and an intermediate spur gear between the chainwheel-sided spur gear and the crank-sided spur gear, wherein the crank-sided spur gear of the reversing stage is non-rotatably connected with the crank-sided spur gear of the first stage, and that the chainwheel-sided spur gear of the reversing stage is supported on a tubular extension of the chainwheel-sided spur gear of the first stage and is coupled to the chainwheel.

12. The crank drive according claim 11, wherein at least one of said spur gears has recesses within the gear lever that reach laterally under a running surface of a toothing system for pressing in rolling bearings.

13. The crank drive according to claim 11, wherein the crank is extendable by an axle differential of the spur gears in the gear lever, so as to induce a corresponding lever extension in the 3 o'clock position.

14. The crank drive according to claim 11, wherein the non-rotatable spur gear is detachably fastened to the frame.

15. The crank drive according to claim 11, wherein a spur gear axis of the spur gear connected to the crank is configured as a chain or belt drive with a tooth ratio of 2:1, wherein a chain tensioner or a belt tensioner produces a chain or belt tension.

* * * * *